Dec. 10, 1957 J. A. NORTHCOTE ET AL 2,815,631
ROTARY MOWER
Filed Sept. 1, 1954 5 Sheets-Sheet 1
FIG. I
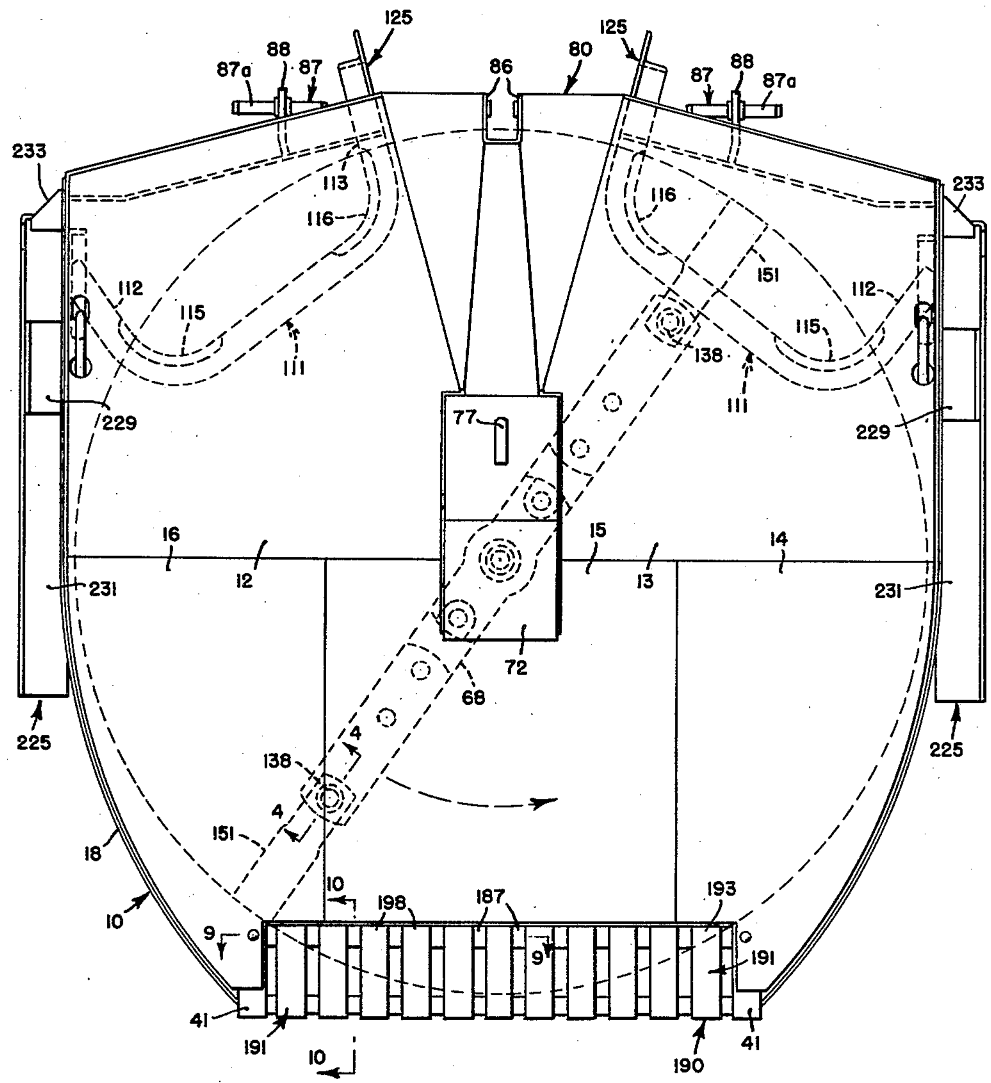
*INVENTORS.*
JOHN A. NORTHCOTE
DAVID W. DIXON
BY
C. F. Parker & R. J. Johnson
ATTORNEYS Dec. 10, 1957 J. A. NORTHCOTE ET AL 2,815,631
ROTARY MOWER
Filed Sept. 1, 1954 5 Sheets-Sheet 2
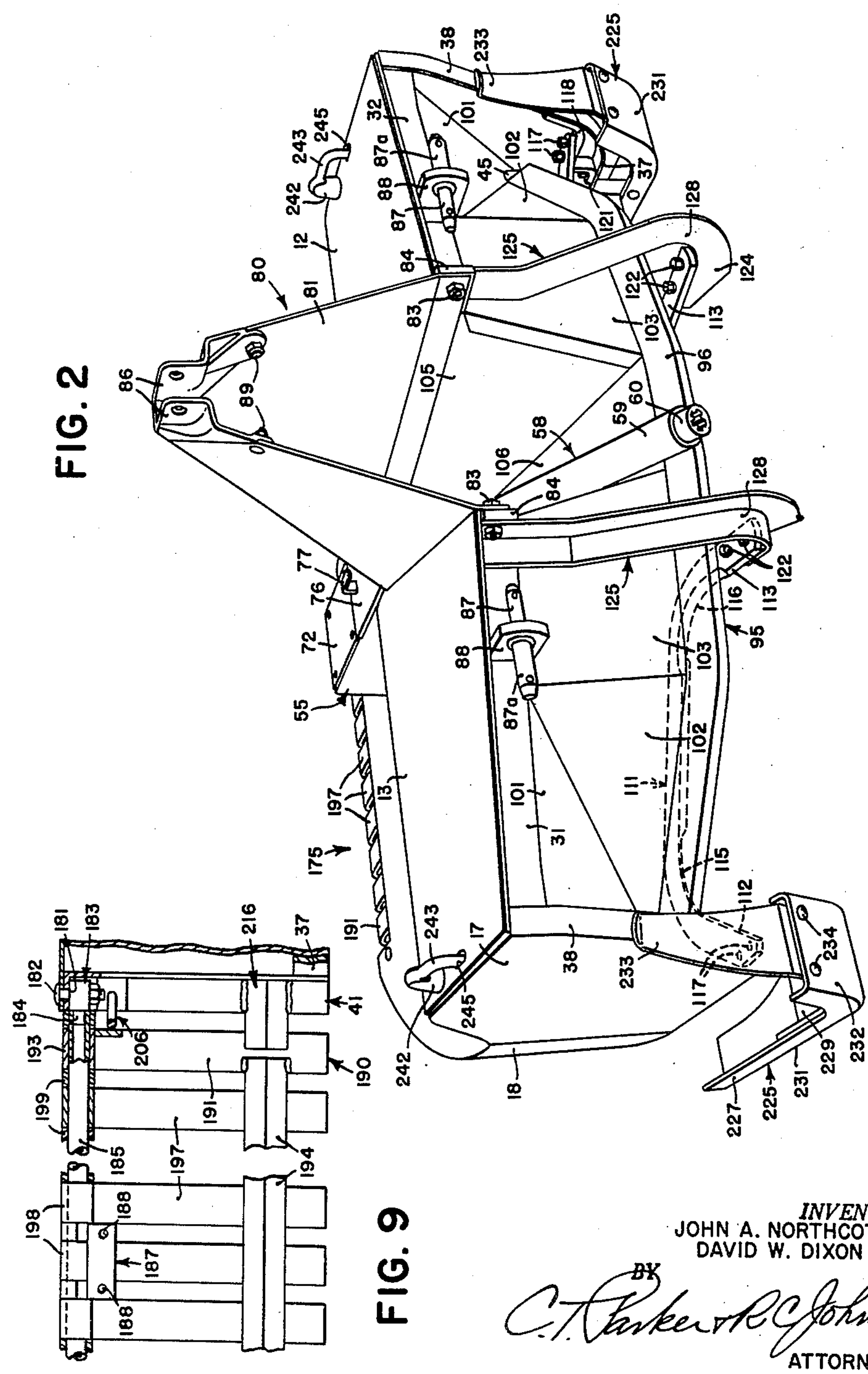
INVENTORS.
JOHN A. NORTHCOTE
DAVID W. DIXON
BY
C. T. Parker & R. C. Johnson
ATTORNEYS ROTARY MOWER
Filed Sept. 1, 1954 
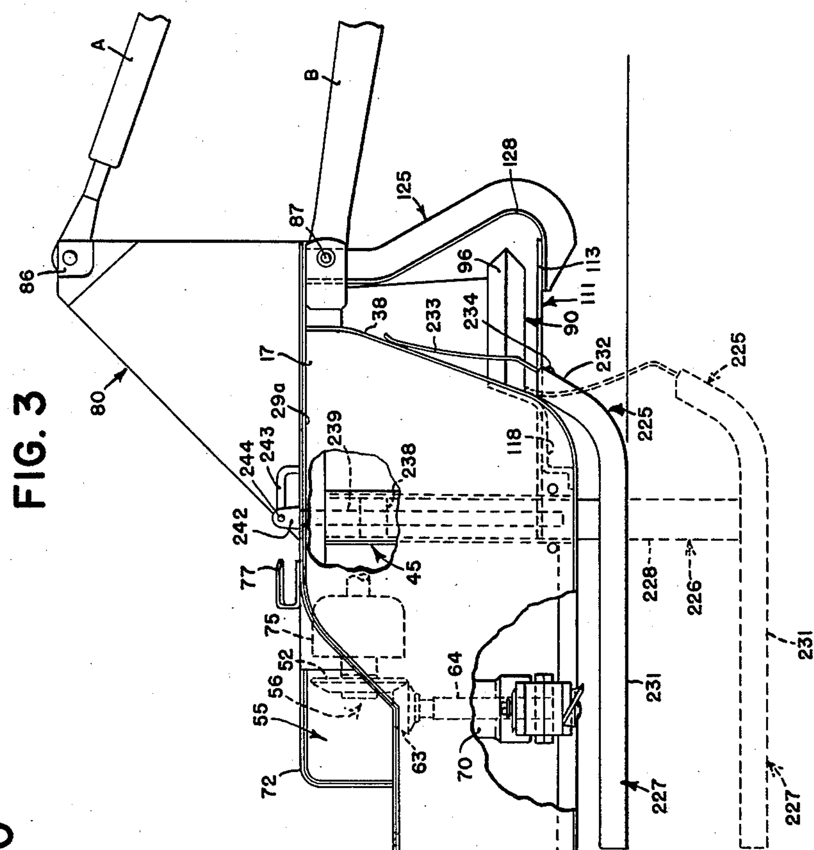
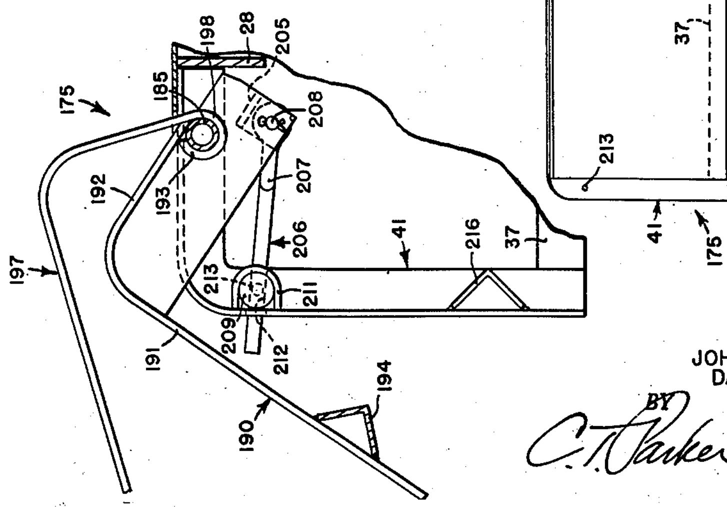
INVENTORS.
JOHN A. NORTHCOTE
DAVID W. DIXON
BY C. T. Parker & R. C. Johnson
ATTORNEYS ROTARY MOWER
Filed Sept. 1, 1954 5 Sheets-Sheet 4
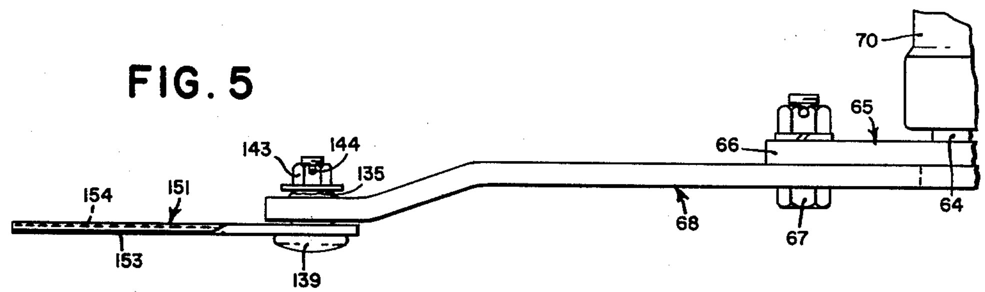
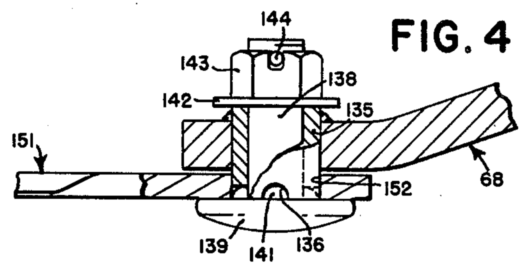
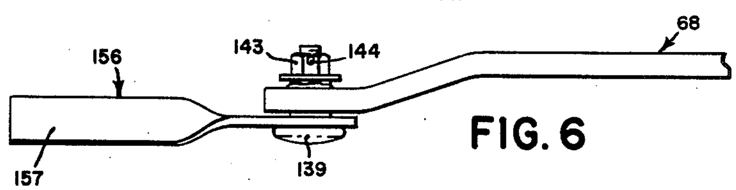
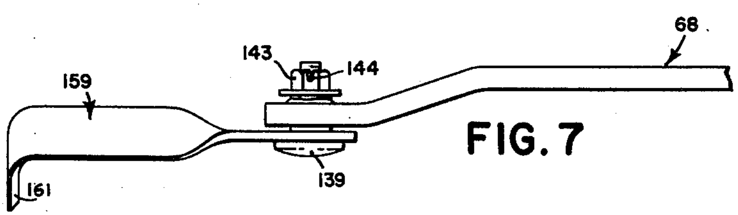
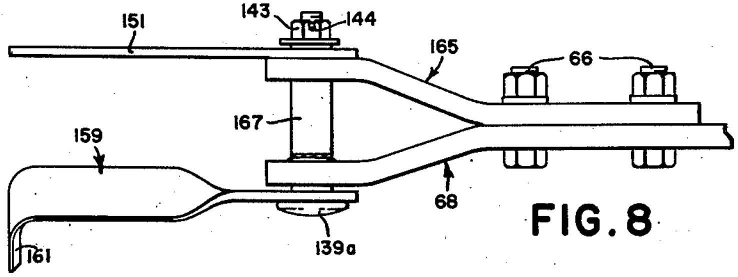
INVENTORS.
JOHN A. NORTHCOTE
DAVID W. DIXON
BY C. T. Parker & Johnson
ATTORNEYS INVENTORS.
JOHN A. NORTHCOTE
DAVID W. DIXON
BY C. T. Parker & R. C. Johnson
ATTORNEYS United States Patent Office 2,815,631

Patented Dec. 10, 1957

1

2,815,631

ROTARY MOWER

John A. Northcote and David W. Dixon, Welland, Ontario, Canada, assignors to John Deere Plow Company (Limited), Welland, Ontario, Canada, a corporation of Canada Application September 1, 1954, Serial No. 453,453

9 Claims. (Cl. 55—118)

The present invention relates generally to agricultural implements and more particularly to tractor-operated rotary mowers or stalk shredders and like implements.

The object and general nature of the present invention is the provision of a new and improved rotary mower or stalk shredder in which a pair of generally forwardly facing U-shaped stationary knives are provided to operate in conjunction with rotatable swinging blades, whereby the rotary mower or stalk shredder is particularly adapted for disintegrating plants growing or standing in rows. Another feature of this invention is the provision of new and improved rear grille means whereby discharge control of the shredded or cut material is effectively secured. Specifically, it is a feature of this invention to provide a plurality of independently mounted grille bars, with means for adjusting the position of all of the grille bars without interfering with the above-mentioned independent action.

These and other objects and advantages of the present invention will be apparent to those skilled in the art after a consideration of the following detailed description, taken in conjunction with the accompanying drawings, in which:

Fig. 1 is a top or plan view of a rotary stalk shredder in which the principles of the present invention have been incorporated.

Fig. 2 is a perspective front view of the stalk shredder shown in Fig. 1.

Fig. 3 is a side view.

Fig. 4 is a view, at an enlarged scale, along the line 4—4 of Fig. 1.

Fig. 5 is a side view of one of the plant-shredding knives and the rotatable support therefor.

Fig. 6 is an enlarged view of a modified form of shredding knife.

Fig. 7 is a side view of another modified form of shredding knife.

Fig. 8 is a side view of a double plant-shredding knife arrangement.

Fig. 9 is a fragmentary view of the rear grille structure, taken generally along the line 9—9 of Fig. 1.

Fig. 10 is a sectional view, taken at an enlarged scale, along the line 10—10 of Fig. 1.

Figure 11:
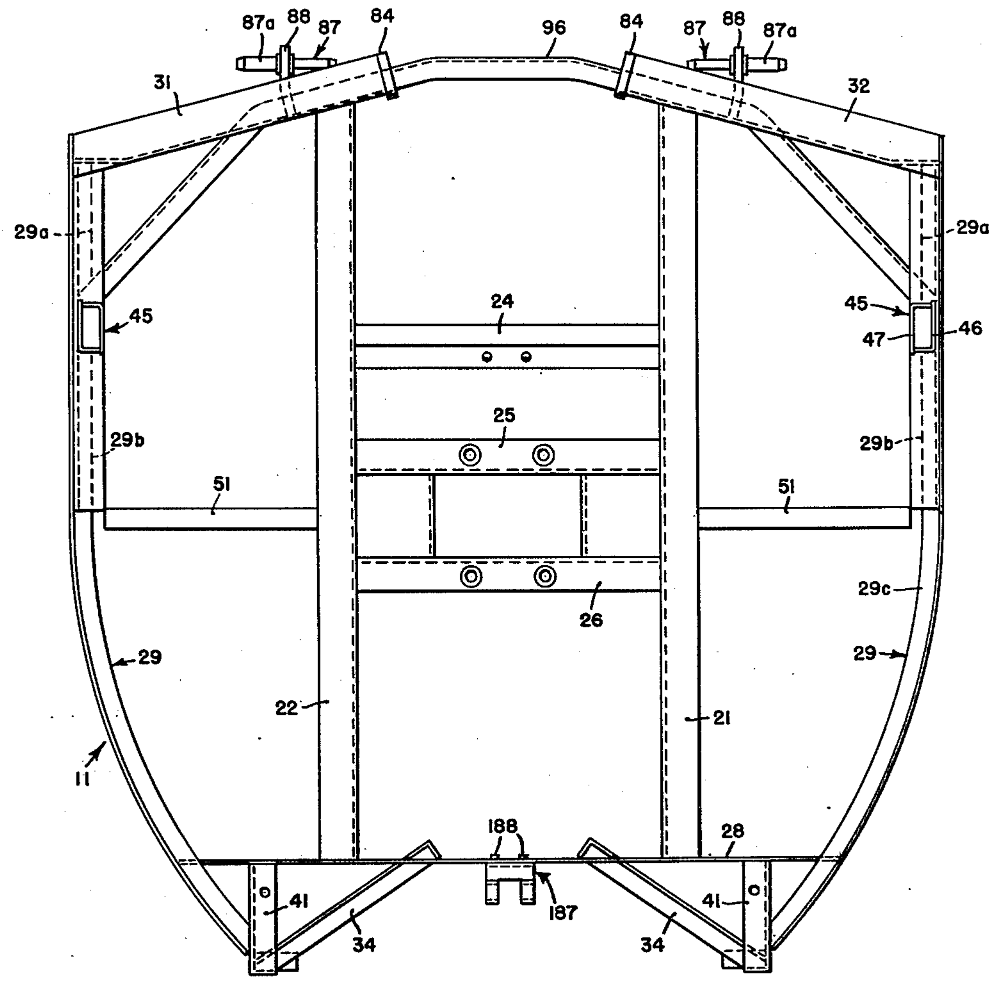
Fig. 11 is a view similar to Fig. 1, showing the details of the supporting framework.

Referring now to the drawings, particularly to Figs. 1 and 2, the mower of the present invention comprises a mower body 10, including a welded framework 11 and suitable enclosure plates 12—16 carried along the top of the framework and side plates 17 and 18 at each side of the machine, the plates 18 being curved. The supporting framework includes a pair of main angles 21 and 22 disposed in generally fore-and-aft extending, laterally spaced apart positions, with suitable interconnecting cross angles 24, 25, and 26 extending between the frame angles 21 and 22. At the rear of the machine an upper crossbar 28 is connected, as by welding, to the rear end of the main angles 21 and 22, extending laterally outwardly therefrom and joined at its ends to the curved sections of a pair of upper side angles 29 that extend forwardly in generally parallel relation at their forward portions and are connected to two upper front angles 31 and 32, these angles extending laterally inwardly and forwardly from the front ends of the side angles 29. At their laterally inner ends, the front angles 31 and 32 are secured, as by welding, to the front ends of the main angles 21 and 22. The rear ends of the side angles 29 are interconnected with the crossbar 28 through diagonal angles 34.

A lower side member 37 having an upturned angle section 38 at its forward portion is fixed to the laterally outer ends of the transverse frame bars 31 and 32, and the rear ends of the lower side angles 37, which curve rearwardly and laterally inwardly, are connected, respectively, to the lower ends of L-shaped angles 41 (Fig. 10), the upper portions of which are connected to the end portions of the transverse rear frame bar 28.

Each of the side angles 29 is made up of two sections, the forward section **29*a* having a rearwardly and downwardly extending section 29*b* that is joined, as by welding, to the rearmost section 29*c*, the forward end of the latter extending forwardly of the downwardly extending section 29*b* and connected at its forward end, as by welding, to a vertical guide structure 45, which is made up of a pair of angles 46 and 47 suitably interconnected, as by welding, and also welded at their upper ends to the associated front angle sections 29*a* and at their lower ends to the adjacent portion of the associated lower angle member 37. Each of the guide members 45 forms a generally tubular part in which a mower-supporting means is mounted for generally vertical adjustment, as will be explained later in more detail. The deck plates 12 and 16 (Fig. 1) have sealing strips 51** (Fig. 11) at their meeting edges.

The generally central portion of the mower body 10 carries a casing 55 in which a bevel gear set 56 is disposed. Connected with the upright bevel gear 52 of the set 56 is a power shaft 58 that includes telescopically associated sections 59 and 60, the latter being adapted to be connected in any suitable way with the power take-off of the tractor to which the mower is adapted to be connected. A horizontal bevel gear 63 is fixed to the upper end of a vertical shaft 64, to the lower end of which a head 65 is fixed, the head 65 including a short bar 66 apertured to receive a pair of bolts 67 by which a knife blade holder 68 is connected to be rotated about the axis of the shaft 64 by power delivered to the mower through the drive shaft 58. The lower section of the casing 55 is formed with a tubular extension 70 in which bearing means, supporting the vertical shaft 64, is disposed. The rear portion of the casing is closed by a removable cover 72 (Fig. 2), and forwardly of the gear case 55 is a slip clutch unit 75, of conventional construction so far as the principles of the present invention are concerned, and access to the clutch 75 is had by means of a removable cover plate 76 having a latch controlling handle 77.

Also forming a part of the mower body 10 is a mast section 80. This member comprises a generally hood-like plate member 81 secured at its lower forward portions, as by bolts 83, to brackets 84 that are fixed to the laterally inner end of the frame angles 31 and 32. At its rear portion the mast section 80 is secured to the central portion of the cross member 24, which preferably is in the form of an angle with its edge section disposed upwardly. The uppermost portion of the mast section 80 is formed as a casting and comprises a member having a pair of spaced apart sections 86 that are apertured to receive the upper connector by which the implement is adapted to be connected to the upper link A of a three-link system. The two lower links B of such a system are adapted to be releasably mounted on a pair of spaced apart pins 87 fixed to brackets 88 that are secured, as by welding, to the transverse frame members 31 and 32, as best shown in Fig. 11. The pins 87 have apertured inner and outer ends whereby the pins are adapted to receive the lower links of a three-link system even though the lateral spacing between the two lower links may vary. One way of securing the member 86 to the mast plate 81 is by means of bolts 89. The laterally outer pin portions of the hitch pins 87 are indicated at **87*a***.

The mower body 10 is completed by front wall means 95. Such front wall means comprises a lower front angle 96 arranged with its edge section facing forwardly and bent into generally arcuate shape, as best shown in Fig. 2. The ends of the front lower angle member 95 are welded to the adjacent portions of the vertical guide channels 45. A pair of front sheets, each having sections 101, 102, and 103, at each side of the mower complete the front wall, together with side and bottom sheets 105 and 106 that, with the upper mast section 80, form a generally forwardly diverging tunnel through which the drive shaft 58 extends and is capable of both lateral and vertical swinging therein.

The working unit of the mower of the present invention includes, not only the rotary shaft 64 and blade holder 68, but also cutting blade means fixed or connected to the end of the blade holder 68 and a pair of cooperating stationary gatherer knives 111. Any one of several forms of cutting blades may be used, as will be pointed out in detail below, and, as best shown in Figs. 1 and 2, each of the gatherer knives 111 comprises a U-shaped member formed generally of flat bar stock and having apertured ends arranged to extend generally forwardly. As best shown in Fig. 1, each knife member 111 comprises a U-shaped knife having generally forwardly extending leg sections 112 and 113, these sections being apertured, and a pair of sharpened sections 115 and 116, one formed at the lower side of the bar while the other is formed at the upper side. By virtue of this construction, the knives 111 are reversible from right to left, and vice-versa. The laterally outer leg portion 112 of each knife is fixed to the mower frame through a pair of bolts 117 that fix the knife to the associated laterally outer side support 118 which, as best shown in Fig. 2, comprises a generally Z-shaped member having one end connected, as by a bolt 121, to the associated side frame angle 37, the upper portion being bolted to the side frame angle sections 38. The laterally inner leg portion 113 of each knife is apertured to receive a pair of bolts 122 by which the knife is secured to the lower rearwardly turned end 124 of a generally vertically disposed knife support 125, there being two of such supports, as best shown in Fig. 2. The upper end of each knife support is secured, as by the bolt 83, to the laterally inner end of the adjacent upper transverse frame bar 31 or 32. Each knife support 125 is provided with a curved section 128 that is shaped so as to clear the front frame angle 96.

Each outer end of the blade holder 68 is adapted to pivotally receive any one of a number of different kinds of blades, and this construction will now be described. As best shown in Fig. 4, each outer end of the blade holder 68 is apertured to receive a bushing 135 that is welded therein, the bushing extending outwardly away from the blade holder 68 in both directions. One end of the bushing is provided with a plurality of notches 136, preferably at the lower side of the blade holder 68, and the bushing 135 is adapted to receive a pivot bolt 138 that has a large diameter head 139 and a plurality of bushing-engaging lugs 141 formed at the juncture of the bolt shank with the bolt head. The lugs 141 are dimensioned so that they do not extend beyond the outer surface of the bushing 135. At the other end of the bolt 138, the latter is threaded and receives a washer 142 and securing nut 143, the latter being held in place by a cotter pin 144. The parts are so constructed and arranged that a blade 151, having an apertured end 152, may be pivotally carried on the bolt 138 between the enlarged head 139 thereof and the lower face of the blade holder 68, the blade 151 being freely pivoted on the lower end of the bushing 135 and held in place by the bolt 138. The radially outer end of the blade 151 is formed with two cutting edges 153 and 154 (Fig. 5) so that the blade may be turned over to provide a new cutting edge. In the form of blade shown in Fig. 5, the cutting portion is straight and arranged horizontally. Other forms of cutting blade are shown in Figs. 6, 7, and 8. In Fig. 6, the blade 156 is pivoted to the blade-supporting bar in the same way as described above in connection with Figs. 4 and 5, but in this case the plane of the cutting portion 157 of the blade lies at an angle to the horizontal. The form of blade shown in Fig. 7 is similar to that shown in Fig. 6 except that, in addition to the angled portion 159 thereof, the end of the blade is formed with a downwardly and outwardly bent portion 161. The blade shown in Fig. 6 is reversible or capable of being turned over so as to present a new cutting edge, but the blade shown in Fig. 7 is not reversible.

Where more aggressive cutting and/or shredding action is desired, the form of blade construction shown in Fig. 8 may be provided. In this form of the invention, an upper blade holder 165 is bolted, as at 166, to the lower blade holder 68, the upper blade holder having a bushing section 167 receiving a long pivot bolt **139*a*, the upper end of the bushing 167 pivotally receiving an auxiliary blade, such as one identical with the blade 151 shown in Fig. 5. With the double blade construction, the upper and lower blades pass over and underneath the stationary knives 111. The blades of Figs. 5, 6 and 7 normally operate underneath the stationary knives 111**.

The rear portion of the mower body 10 is provided with an adjustable grille construction, indicated in its entirety by the reference numeral 175. The upper forward portions of each of the L-shaped angle frame members 41 are each provided with an opening 181 in the upper horizontal flange thereof, and a fastening member 182 passes through each opening 181 and secures in place to the associated member 41 a grille support stud 183 which is formed with a reduced inner end 184 forming a pivot support for a pipe member 185 that forms a supporting member for the grille 175. A central portion of the pipe member is carried upon a center-supporting bracket 187 that is bolted, as at 188, to the associated rear crossbar 28 of the mower body frame. A grille frame 190 is pivotally mounted on the pipe member 185 and comprises end grille members 191 having an upwardly forwardly extending section 192 terminating in a bushing section 193 rotatably disposed on the pipe member 185. The grille frame 190 includes two members 191 arranged in spaced apart relation so that each member 191 lies adjacent the associated L-shaped frame member 41, the members 191 being rigidly interconnected by a crossbar 194 the ends of which are secured, as by welding, to the lower portions of the end members 191. The grille 175 also includes a plurality of individually pivotal grille members 197, each including a bushing section 198 that is swingable on the associated pipe member 185, the swinging movement of such members being limited by the crossbar 194. The grille bars 191 and 197 are maintained in spaced apart relation by bushings 199 mounted on the pipe member 185.

The grille 175 may be held in different rearward and upward positions, depending upon crop conditions and other factors, such as the amount of material it is desired to have escape rearwardly from the mower housing. To this end, adjustable securing means is connected with each of the grille members 191. Each member 191 is provided with a bracket 205 to pivotally receive the forward end of a grille-adjusting rod 206, the forward end being laterally inwardly offset, as indicated at 207 in Fig. 10. The forward laterally inward offset section 207 is apertured to receive a pivot member 208 connecting the rod member 206 to the bracket 205. The rear or straight portion of each of the rods 206 passes through a grille-adjusting block 209 that is carried in a U-shaped clip 211 fixed, as by welding, to the adjacent frame angle member 41, each block member 209 being rockable within the U-shaped bracket 211. The block members 209 are apertured, as at 212, to receive the rod 206, and each of the block members 209 is tapped to receive an adjusting nut 213 that, when tightened, fixes the rod member 206 in the bushing or block 209, thus serving to hold the grille frame 190 in different rearwardly and upwardly disposed positions. Each of the grille bars 197 is, however, freely swingable upwardly and away from the grille frame bar 194, serving thereby as an overload relieving mechanism. Thus, the adjustable grille 190, which is not only adjustable as a whole, but is also provided with individually swingable bars 197, serves as a means for controlling the discharge of the material shredded by the rotating blades and the stationary knives. The side and front shields or plates prevent the discharge of any shredded material laterally or forwardly toward the operator of the tractor to which the machine is connected.

The crossbar 194 is preferably in the form of an angle with its edge section directed forwardly and with the flanges thereof diverging rearwardly, whereby to minimize the tendency for shredded material to be retained thereon. Each of the frame members 41 is provided with a stop section 216 of similar construction and arranged so as to aline with the grille frame crossbar 194. The stop sections 216 limit the forward movement of the lower end of the grille bars 190 and 197.

The mower body and the rotating blades carried thereby are supported at the desired position relative to the ground surface by means of a pair of vertically adjustable skid units 225. Each of the units 225 includes a standard section 226 and a skid section 227. The standard section 226 is made up of a generally tubular member, rectangular in cross section, the tubular member being indicated by the reference numeral 228, and a foot portion 229 that is bolted or otherwise secured to an elongated channel-like member 231 that forms the principal portion of the skid section 227, the member 231 having an upturned sled runner front portion 232. A spring member 233 is bolted, as at 234, to the front end of the skid section 231 and serves to close the gap between the skid and the adjacent portion of the front of the mower frame so as to prevent trash and the like from passing between the skid and the frame, particularly when the mower is adjusted for a relatively high position, as indicated in dotted lines in Fig. 3.

Any suitable means may be provided for adjusting the vertical position of the skid units 225 relative to the mower frame which they support. For example, the tubular member 228 of each skid unit 225 may be provided with a screw-threaded trunnion 238 into which the lower threaded end of an adjusting rod 239 extends. The upper end of the rod 239 is pinned or fixed in any suitable way to a crank swivel member 242 to which a crank member 243 is pivotally connected, as at 244. For holding any desired adjustment, the upper housing sheet, 12 or 13, may be provided with an opening 235 to receive the outer end of the crank member 243.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a rotary mower having a casing normally disposed horizontally and provided with a discharge opening, the improvement comprising a grille construction disposable over said discharge opening and swingable about a transverse axis located at the upper side of said discharge opening, said grille construction comprising a grille frame pivoted for movement about said axis, a plurality of grille bars pivoted to said grille frame for relative individual outward movement about said axis, means on said grille frame to limit movement of said grille bars in the inward direction relative to said frame, and means fixing said grille frame in different positions about said axis.

2. In a rotary mower, having an opening, a grille construction comprising a grille frame adapted to be mounted so as to be swingable upwardly and away from said opening, said grille frame including a transverse bar, a plurality of independently swingable grille bars overlying said transverse bar, said grille bars being pivoted to said grille frame at points spaced from said transverse bar, and means pivotally connecting all of said grille bars to said grille frame for swinging movement toward and away from said bar, whereby by swinging said frame, all of said bars may be opened to substantially the same extent.

3. A grille construction for rotary mowers or the like, including a grille frame that comprises a pair of end bars, a stop bar fixed at its ends to said end bars and holding the latter in spaced apart relation, a cross shaft receiving one end of each of said end bars and pivotally supporting said grille frame, a plurality of intermediate grille bars pivotally mounted on said shaft between said end bars, said intermediate grille bars being individually pivoted on said cross shaft for movement toward and away from said stop bar, and means connected with said grille frame for swinging said grille into different positions about said cross shaft.

4. The invention set forth in claim 3, further characterized by sleeve members on said shaft for holding said intermediate bars in spaced apart relation.

5. The invention set forth in claim 3, further characterized by said last mentioned means comprising means serving as an arm connected with each grille end bar, a link pivoted to each arm means at a point spaced from the axis of said cross shaft, and means connected with said links for locking the latter in different positions, serving thereby to hold said grille in different positions.

6. In a rotary mower, a stalk shredding rotor movable in a generally horizontal plane, a rotor-enclosing casing provided with a discharge opening spaced rearwardly of said rotor and disposed approximately in the same horizontal plane as said rotor, and a grille construction therefor comprising a plurality of generally L-shaped bars disposed in side by side relation with the longer legs of said L-shaped bars extending downwardly substantially to the horizontal plane of said rotor and the shorter legs of said L-shaped bars extending forwardly from the upper portions of said longer legs, shaft means connected with the forward portion of the short leg of each bar for pivotally mounting said grille over said casing opening, and said L-shaped bars being spaced apart to provide material egress zones between the shorter legs and also between the longer legs of said grille bars, whereby at least some of the cut material may be discharged generally upwardly through the spaces between the forwardly extending shorter legs of the grille bars.

7. In a rotary mower having a casing normally disposed horizontally provided with a discharge opening, the improvement comprising a grille construction disposable over said discharge opening and swingable about a transverse axis located at the upper side of said discharge opening, said grille construction comprising a grille frame pivoted for movement about said axis, a plurality of grille bars pivotally mounted relative to said grille frame for individual outward movement generally about said axis, means on said grille frame to limit movement of said grille bars in the inward direction relative to said frame, and means fixing said grille frame in different positions about said axis.

8. In a rotary mower, a casing having an opening, a grille construction comprising a grille frame adapted to be mounted so as to be swingable upwardly and away from said opening about a pivot axis, said grille frame including a transverse bar, a plurality of independently swingable grille bars overlying said transverse bar, and means pivotally connecting said grille bars with said casing for movement relative thereto with said grille frame, said independently swingable grille bars being movable toward and away from said bar, and said grille bars being engageable with said transverse bar whereby, by swinging said frame, all of said bars may be opened to substantially the same extent.

9. A grille construction for rotary mower or the like having a casing provided with an opening, including a grille frame that comprises a pair of end bars and swingably mounted over said opening, a stop bar fixed at its ends to said end bars and holding the latter in spaced apart relation, a cross shaft carried by said casing adjacent said opening, a plurality of intermediate grille bars pivotally mounted on said shaft and disposed generally between said end bars, said intermediate grille bars being individually pivoted on said cross shaft for movement toward and away from said stop bar, and means connected with said grille frame for swinging said grille into different position about said cross shaft.

References Cited in the file of this patent

UNITED STATES PATENTS

| | | |
|---|---|---|
| 813,957 | Eisenhart | Feb. 27, 1906 |
| 1,419,158 | Luce | June 13, 1922 |
| 1,987,565 | Schuster | Jan. 8, 1935 |
| 2,429,492 | Scranton | Oct. 21, 1947 |
| 2,621,457 | Rosenberg | Dec. 16, 1952 |
| 2,640,711 | Preble et al. | June 2, 1953 |
| 2,649,678 | Sishc | Aug. 25, 1953 |
| 2,659,191 | Miller et al. | Nov. 17, 1953 |
| 2,667,727 | Pool et al. | Feb. 2, 1954 |
| 2,692,466 | Brunts et al. | Oct. 26, 1954 |